Nov. 12, 1957　　　J. LE FOLL ET AL　　　2,812,635
PULSE JET ENGINES WITH A REARWARDLY OPENING AIR INLET
Filed March 6, 1953
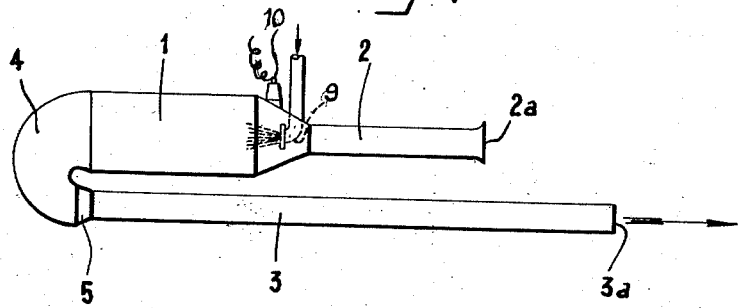
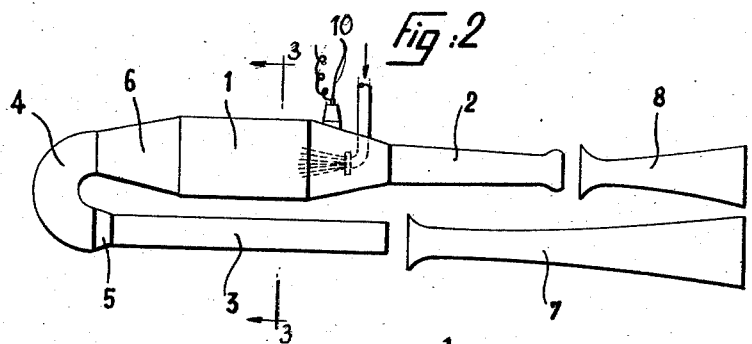
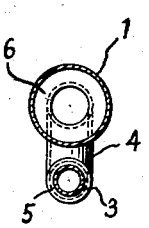
INVENTORS
Jean Le Foll
Jean H. Bertin
By Watson, Cole, Grindle &
　　Watson
　　　　ATTORNEYS

United States Patent Office 2,812,635
Patented Nov. 12, 1957

2,812,635

PULSE JET ENGINES WITH A REARWARDLY OPENING AIR INLET

Jean Le Foll, Le Pre-Saint-Gervais, and Jean H. Bertin, Neuilly-sur-Seine, France, assignors to Societe Nationale d'Etude et de Construction de Moteurs d'Aviation, Paris, France, a company of France Application March 6, 1953, Serial No. 340,834

Claims priority, application France March 11, 1952

6 Claims. (Cl. 60—35.6)

Improvements have been effected in the construction of pulsatory combustion chambers by replacing the mechanical inlet valves by flap-valves of the so-called aerodynamic type, that is to say arrangements consisting of simple tubular members which are constantly open but are formed in such a manner that their resistance to the flow of air towards the combustion chamber is very much lower than their resistance to the flow of the gases from the combustion chamber to the atmosphere. However small the escape of gas to the atmosphere through these aerodynamic valves may be, it is inevitable that it must exist and in a pulse-jet, this gas escape, projected towards the front, causes a counter-thrust which acts in opposition to the propulsive thrust produced by the jet and it is therefore desirable to eliminate it if it is sought to improve the efficiency of the pulse-jet.

It has already been proposed to collect or recover the gases which escape through the areodynamic valve of a pulse-jet, by arranging in front of the inlet orifice of this valve, and spaced at a short distance from it, a tubular member suitably arranged and bent round through 180°, in order that the outlet of this tubular member may be directed in the same direction as the exhaust nozzle of the impulse-jet. Such an arrangement has, however, the disadvantage of increasing the weight of the reactor.

The improvement which forms the object of the present invention overcomes the detrimental effects of the gas escape through the aerodynamic valve or any other type of admission device of an impulse-jet, without it being necessary to provide a tubular recovery member, the principle of which has been referred to above.

According to this improvement, the path followed by the air or gas between the air inlet orifice of the impulse-jet and the exhaust orifice includes one or a number of bends so disposed that the air inlet orifice faces in the same direction as the exhaust orifice, the escape of gas through the admission device of the impulse-jet thus producing a postiive thrust which assists that of the gases expelled through the exhaust orifice instead of being opposed to it.

It is of advantage to situate the bend or bends at a part of the impulse-jet at which the gas in movement has a relatively low velocity and, in this respect, an advantageous embodiment is that in which a bend at 180° is provided at the junction of the combustion chamber and the exhaust nozzle, in a zone at which the expansion of the gases is still not entirely complete.

The description which follows below with reference to the attached drawing (which is given by way of example and not in any sense of limitation) will make it quite clear how the invention may be carried into effect.

Figs. 1 and 2 illustrate two forms of the invention.

Fig. 3 is a cross-section taken along line III—III of Fig. 2.

In the pulse jet engine illustrated in Fig. 1, the combustion chamber 1 with its fuel injector 9 and igniter 10 and the aerodynamic valve 2 are shown, the latter being intended for the admission of air into the combustion chamber in which is maintained the pulsatory combustion. This valve is assumed to be of the type described by the applicants in their U. S. patent application, Serial No. 229,945, filed June 5, 1951, now Patent No. 2,795,931, but it may be of any other type, for example of the type with domed rings described in U. S. patent application, Serial No. 56,582 filed October 26, 1948, now Patent No. 2,670,011. The tubular exhaust member 3 develops the expansion of the gases generated in the chamber 1 and from it these gases are expelled in the form of a high-speed jet, suitable for the propulsion by reaction of any movable body on which the apparatus is fixed. Whilst in the known forms of pulse-jets the aerodynamic valve 2 opens to the opposite side of the exhaust nozzle 3, that is to say towards the front of the movable body to be propelled, the members 2, 1 and 3 being centered on the same axis, the apparatus shown in the drawing comprises a bend 4 at 180° so that the aerodynamic valve has its opening to the rear in the same way as the exhaust nozzle 3.

As can well be understood, the result of this arrangement is that the escape of gases through the aerodynamic valve at the moment of each explosion produces a thrust, the effect of which is additional to that of the gases expelled from the exhaust nozzle 3, the disadvantage of aerodynamic valves in respect of the value of the total thrust developed being thus overcome.

The bend 4 can be placed at different points of the path of air proceeding from the inlet orifice 2a, of the aerodynamic valve to the outlet orifice 3a of the exhaust nozzle. It could, for example, be provided in the length of the aerodynamic valve itself, the combustion chamber 1 then being mounted in its usual position, co-axially with the exhaust nozzle 3. However, the arrangement shown in Fig. 1, in which the bend 4 is located at the outlet of the combustion chamber is preferable, since at this point the gases have not yet attained a high speed and their deflection can thus take place with a minimum loss of energy.

The bend may also be provided within the length of the combustion chamber 1 which will thus be folded back on itself.

In the embodiment shown in Fig. 1, the bend 4 is slightly convergent and is joined to the exhaust tube 3 by the most acutely convergent portion 5, which terminates the expansion and the deflection of the jet of gas at the exit from the bend 4.

In the embodiment shown in Fig. 2, the bend 4 is of constant cross-sectional area. It is interposed between a convergent member 6 which follows the chamber 1, and a convergent member 5 which joins it to the exhaust nozzle 3.

The arrangements employing dilution ejectors which have been described by the applicants in their U. S. patent application, Serial No. 229,947, filed June 5, 1951, can be applied equally well to the jet expelled from the nozzle 3, as described in the above application, as to that delivered from the aerodynamic valve 2. Such an arrangement is shown in Fig. 2 where the ejectors in question are shown respectively as 7 and 8.

What we claim is:

1. A pulse jet engine comprising in combination an intermittent firing combustion chamber, an air inlet device connected to one end of said chamber and having an orifice facing towards the rear of said engine, an exhaust pipe extending alongside the combustion chamber and having an outlet facing in the same direction as said orifice, said exhaust pipe being fed solely from said combustion chamber, and a pipe bend of substantially 180° connecting the beginning of the exhaust pipe with the other end of the combustion chamber, to form with said pipe and chamber a constinuous gas conveying duct.

2. An engine as claimed in claim 1 wherein the beginning of the exhaust pipe is of converging shape.

3. An engine as claimed in claim 2 wherein the other end of the combustion chamber is of converging shape and the bend of substantially uniform cross-section.

4. An engine as claimed in claim 2 wherein the bend is of continuously decreasing cross-sectional area.

5. An engine as claimed in claim 1 wherein the air inlet device is a tubular duct extending parallel to the exhaust pipe.

6. An engine as claimed in claim 5 further comprising two thrust augmenting tubes of converging-diverging shape coaxial with and spaced from the orifice of the air inlet device and the outlet of the exhaust pipe.

References Cited in the file of this patent

UNITED STATES PATENTS

| | | |
|---|---|---|
| 2,525,782 | Dunbar | Oct. 17, 1950 |
| 2,574,460 | Bohanon | Nov. 13, 1951 |
| 2,639,580 | Stuart | May 26, 1953 |

FOREIGN PATENTS

| | | |
|---|---|---|
| 640,577 | France | Apr. 2, 1948 |